United States Patent [19]

Shinoda et al.

[11] Patent Number: 4,886,524
[45] Date of Patent: Dec. 12, 1989

[54] METHOD FOR TREATING WASTE LIQUID IN WET EXHAUST GAS TREATING APPARATUS

[75] Inventors: Naoharu Shinoda; Kenichi Yoneda; Masao Hino, all of Hiroshima; Kenzo Muramatsu, Tokyo; Masato Miyake, Tokyo; Taku Shimizu, Tokyo; Hidehiko Otani, Kobe, all of Japan

[73] Assignee: Mitsubishi Jukogyo Kabushiki Kaisha, Tokyo, Japan

[21] Appl. No.: 207,925

[22] Filed: Jun. 13, 1988

Related U.S. Application Data

[63] Continuation of Ser. No. 2,869, Jan. 13, 1987, abandoned.

[51] Int. Cl.⁴ .............................................. B03C 3/01
[52] U.S. Cl. ........................................... 55/8; 55/10; 55/122; 55/126
[58] Field of Search ....................................... 55/7–11, 55/122, 126, 135

[56] References Cited

U.S. PATENT DOCUMENTS

| | | | |
|---|---|---|---|
| 1,413,877 | 4/1922 | Schmidt | 55/8 |
| 1,416,769 | 5/1922 | Wolcott | 55/7 |
| 3,444,668 | 5/1969 | Masuda | 55/122 |
| 3,926,586 | 12/1975 | Matts | 55/10 |

FOREIGN PATENT DOCUMENTS

| | | | |
|---|---|---|---|
| 1085854 | 7/1960 | Fed. Rep. of Germany | 55/122 |
| 2148902 | 5/1972 | Fed. Rep. of Germany | 55/10 |
| 3430016 | 3/1986 | Fed. Rep. of Germany | 55/10 |
| 1361733 | 7/1963 | France | 55/126 |
| 60-84131 | 5/1985 | Japan | 55/9 |
| 840707 | 7/1960 | United Kingdom | 55/122 |
| 912391 | 12/1962 | United Kingdom | 55/122 |
| 1002769 | 8/1965 | United Kingdom | 55/122 |

Primary Examiner—Jay H. Woo
Assistant Examiner—C. Scott Bushey
Attorney, Agent, or Firm—Toren, McGeady & Associates

[57] ABSTRACT

The present invention relates to a method for treating a waste liquid from a wet exhaust gas treating device. In a waste diminishing system which has heretofore been used, a necessary distance of a flue between a spray nozzle and a dry electric dust collector has been within the range of about 30 to about 40 meters. The present invention is characterized by rendering vacant a first chamber of the dry dust collector, or alternatively providing a vacant chamber on the upstream side of the dry dust collector in order to treat an exhaust gas, whereby the length of the aforesaid fue can be reduced to about 10 meters or less.

2 Claims, 3 Drawing Sheets

4,886,524

METHOD FOR TREATING WASTE LIQUID IN WET EXHAUST GAS TREATING APPARATUS

This is a continuation of application Ser. No. 002,869 filed Jan. 13, 1987 now abandoned.

BACKGROUND OF THE INVENTION

1. Field of the Invention

The present invention relates to a method for treating a waste liquid from a wet exhaust gas treating device.

2. Description of the Prior Art

Heretofore, a waste liquid from a wet exhaust gas treating device must be additionally treated, since it cannot be discharged directly to a drain or the like. For example, a waste liquid diminishing system is utilized in which the waste liquid is introduced into a flue connecting to a dust collector and is treated therein, and now, this system will be described in reference to FIG. 2.

An exhaust gas from a boiler 11 is guided through a flue 12 to an air heater 13 in which the exhaust gas is heat exchanged with air, whereby a temperature of the exhaust gas falls. The exhaust gas coming from the air heater 13 is led to a dry electric dust collector 2 through a flue 8. In the middle of the way, a waste liquid is sprayed into the flue 8 through a spray nozzle 1, so that the temperature of the exhaust gas drops.

In the dry electric dust collector 2, a dust in the exhaust gas and the waste liquid are dried to produce a solid material, and the latter is collected therein. The collected solid material is transported to an ash collector (not shown) by means of an ash transport device 6.

The exhaust gas which has left the dry electric dust collector 2 is led through a flue 14 to a gas heater 15, in which the exhaust gas is heat exchanged with a gas coming from a wet exhaust gas treating device 17, so that the temperature of the exhaust gas falls.

The exhaust gas from the gas heater 15 is guided to the wet exhaust gas treating apparatus 17 through a flue 16. In the wet exhaust gas treating device 17, a sulfurous acid gas in the exhaust gas and a dust which has not been collected by the dry electric collector 2 are further collected and removed therefrom.

The exhaust gas coming from the wet exhaust gas treating device 17 is introduced through a flue 18 into the gas heater 15 in which heat exchange is carried out, and it is further delivered via a flue 19 to a chimney 20, and is then discharged therethrough into the atmosphere.

The waste liquid from the wet exhaust gas treating device 17 is guided to a neutralizing tank 22 via a waste liquid line 21. In the neutralizing tank 22, slaked lime is introduced through a neutralizer line 23 in order to neutralize the waste liquid. The thus neutralized waste liquid is guided to the waste liquid spray nozzle 1 through a waste liquid line 24, and is then sprayed into the flue 8.

Now, reference will be made in accordance with FIG. 3 to the feature of a conventional constitution between the waste liquid spray nozzle 1 and the dry electric dust collector 2 in the waste liquid diminishing system.

The dry electric collector 2 has a conventional structure. At an upstream position of the collector 2, the spray nozzle 1 is disposed. The waste liquid sprayed through the spray nozzle 1 is evaporated and thereby dried in the flue 8, but a part of the dried substance is accumulated as an in-flue deposit 7 in the flue 8. The major remaining dried solid material 5 is collected by a discharge electrode 3 and a dust collecting plate 4 in the dry electric dust collector 2, and is then transported to the ash collector by means of the ash transport device 6 disposed under the dust collector 2.

In this connection, the liquid droplets sprayed through the spray nozzle have to reside in the exhaust gas for a period of about 2 seconds for the sake of its evaporation. On the other hand, a gas flow rate in the flue is usually within the range of 15 to 20 m/sec, and thus the flue having as extraordinarily great a length as that of about 30 to about 40 meters is necessary. If the above mentioned gas flow rate is lowered, the dust will be accumulated in the flue.

SUMMARY OF THE INVENTION

The present invention intends to provide a method for treating a waste liquid in an exhaust gas treating device by which drawbacks of a conventional method for treating the waste liquid are overcome, e.g., in which the length of a flue between a spray nozzle and an electric collector is reduced to about 10 meters or less without lowering any collection effect of the electric dust collector.

The gist of the present invention resides in a method for treating a waste liquid in an exhaust gas treating apparatus which comprises the steps of leading an exhaust gas to a dry dust collector in which a dust contained in the exhaust gas is removed therefrom, guiding the exhaust gas to a wet exhaust gas treating device in which the exhaust gas is purified, introducing a waste liquid from the exhaust gas treating device into an upstream position of the dry dust collector, and collecting the resulting dry solid material by the dry dust collector, the method for treating the waste liquid being characterized by rendering vacant a first chamber of the dry dust collector or providing a vacant chamber on the upstream side of the dry dust collector, and spraying the waste liquid from the exhaust gas treating device into a flue on the upstream side of the vacant chamber.

That is, in the present invention, it is contemplated to prevent the accumulation of the dust which is formed when the flow rate of the exhaust gas is lowered, while securing a residence time of sprayed liquid droplets in the exhaust gas. And for this purpose, the present invention is characterized in that the first chamber in the dry dust collector is rendered vacant, or alternatively the vacant chamber is disposed on the upstream side of the dry dust collector so as to treat the exhaust gas therein.

DESCRIPTION OF THE PREFERRED EMBODIMENT

Figure 1:
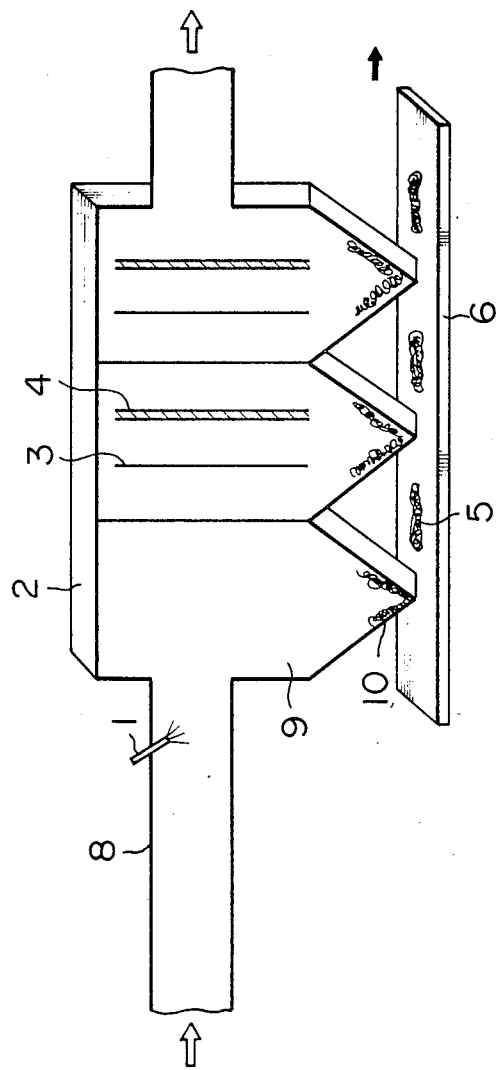
FIG. 1 is a schematic view showing the constitution of one device for the practice of the present invention.

In FIG. 1 attached thereto, reference numeral 1 is a spray nozzle from a waste liquid in an exhaust gas treating apparatus. Numeral 2 is a dry electric dust collector, and at an upstream position of the collector 2, the spray nozzle 1 is disposed.

The waste liquid sprayed through the spray nozzle 1 is dried in a flue 8 and a first vacant chamber 9 in the dry electric dust collector 2, and the resulting solid material 10 is transported to an ash collector (not shown) together with a dust 5 collected in a second and a third chamber of the dry electric dust collector by means of an ash transport device 6 disposed under the respective chambers.

From research results obtained by the inventors of the present application, it has been apparent that in the electrical dust collector, a temperature of the exhaust gas can be desirably adjusted so as to heighten a dust collection efficiency by spraying the waste liquid, and that the dust collection efficiency can also be enhanced by allowing dry solid materials such as sodium, calcium and magnesium to be attached to a dust collecting plate, and by electrical conductivity of these solid materials.

Therefore, by selecting a flow rate and a composition of the waste liquid to be sprayed, the dust collection efficiency can be heightened, and in consequence even if the first chamber is rendered vacant, the dust collection efficiency does not decline.

Next, a comparative example and an example of the present invention will be described.

(1) Comparative Example (Conventional Example)

Figure 2:
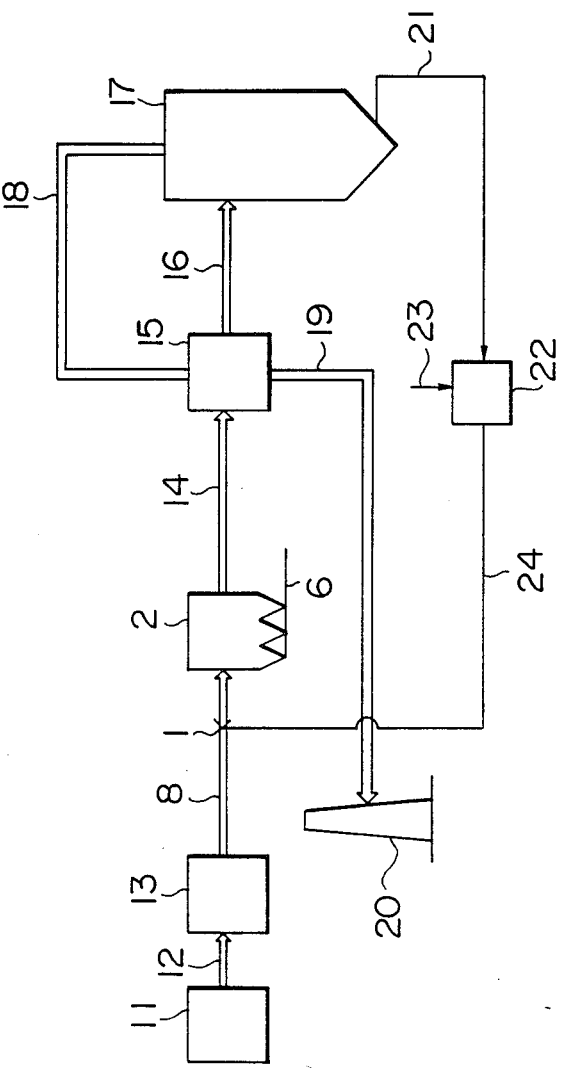
FIG. 2 is a flow sheet of a waste liquid diminishing system in a wet exhaust gas treating apparatus.

A conventional method was carried out by the use of a pilot plant shown in FIG. 2 by which a coal-fired exhaust gas could be treated at 4,000 Nm$^3$/H. The composition of the exhaust gas is set forth in Table 1.

TABLE 1

| Composition of Exhaust Gas in Pilot Plant | |
|---|---|
| Amount of Treated Gas | 4,000 Nm$^3$/H |
| Concentration of SO$_2$ | 1,200 ppm |
| Concentration of HCl | 30 ppm |
| Concentration of HF | 7 ppm |
| Concentration of Dust | 300 mg/Nm$^3$ |
| H$_2$O in Exhaust Gas | 7.8% |
| (Gas Temperature | 150° C.) |

A waste liquid from a wet exhaust gas treating device 17 was led to a neutralizing tank 22 via a waste liquid line 21 at 20 l/H. To the neutralizing tank 22, a slaked lime slurry was fed at 5 l/H. The composition of the slurry in the neutralizing tank is shown in Table 2. The treated waste liquid was then sprayed through a spray nozzle 1 to a flue 8 at a flow rate of 25 l/H.

TABLE 2

| Composition of Slurry in Neutralizing Tank | |
|---|---|
| pH | 8.0 |
| Conc. of Suspended material | 2 wt % |
| Cl Concentration | 10,000 ppm |
| F Concenration | 500 ppm |

Figure 3:
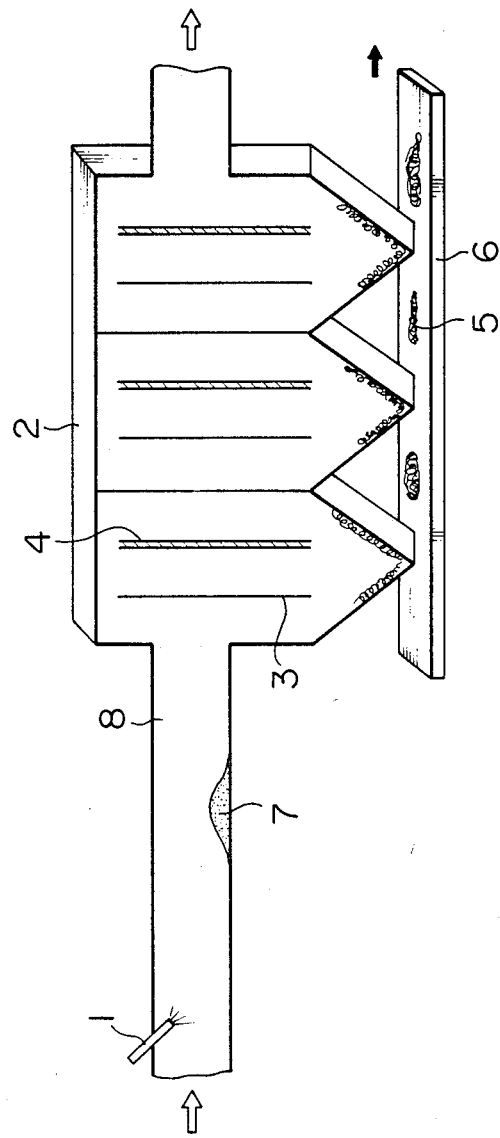
FIG. 3 is a schematic view of a conventional device corresponding to that of FIG. 1.

The distance between the spray nozzle and the electric dust collector was 40 meters. When a continuous operation was carried out for one month, an amount of the accumulated deposit in the flue 8 was about 40 kg. The dust removal efficiency of the electric dust collector was 95%. The electric dust collector was composed of a first, a second and a third chamber, shown in FIG. 3.

(2) Example

A spray nozzle 1 for a waste liquid was disposed 10 meters upstream of the electric dust collector. A discharge electrode and a dust collecting plate were removed from a first chamber of the electric dust collector, so that a vacant chamber was prepared therein. The composition of an exhaust gas was as shown in Table 1 and thus was all the same as in the comparative example.

The resulting waste liquid was delivered from the wet exhaust gas treating device 17 into a neutralizing tank 22 via a waste liquid line 21 at a flow rate 20 l/H, and a 10 wt% slaked lime slurry was also fed to the neutralizing tank 22 at 5 l/H. The composition of the slurry in the neutralizing tank was as shown in Table 2.

The treated waste liquid was sprayed into a flue 8 through a spray nozzle at a flow rate of 25 l/H. When a continuous operation of the apparatus was carried out for one month, no deposit was confirmed in the flue 8. A dust removal efficiency of the electric dust collector was 95%.

As is definite from the foregoing, in the example of the present invention, the dust removal efficiency of the electric dust collector was the same as in the comparative example, though the distance between the nozzle and the electric dust collector was 10 meters, i.e., a quarter of the corresponding distance in the case of the comparative example. In addition, with regard to the deposit formed in the flue during one month's continuous operation, its amount was about 40 kg in the comparative example, but no deposit was formed in the example regarding the present invention. This indicates an extremely remarkable difference in functional effect.

Since taking the above mentioned constitution, the present invention has the following functional effects:

(1) The length of the flue necessary for the evaporation of the waste liquid can be reduced.

(2) No deposit is formed in the flue, and therefore the reliability and the operating efficiency of the waste liquid diminishing system can be heightened.

(3) Although the first chamber of the dry electric dust collector is vacant, the dust collection effect can be maintained.

What is claimed is:

1. A method for separating dust from an exhaust gas, comprising the steps of feeding the exhaust gas through a flue at a flue flow rate in the range of 15 to 20 m/s; spraying a waste liquid into the exhaust gas flowing within the flue at a point immediately adjacent the downstream end of the flue; introducing the wetted exhaust gas from the flue into a first vacant dust collection chamber having a hoppered outlet;

allowing the exhaust gas flow rate to be reduced within said first chamber such that waste liquid droplets sprayed into the exhaust gas have a residence time of approximately 2 seconds prior to the exhaust gas exiting said first chamber;

feeding the exhaust gas from said vacant chamber into a series of hoppered dust collection chambers, each of which include a discharge electrode and a dust collecting plate; and removing the dust collected from each of the hoppered chambers.

2. The method of claim 1, wherein said flue extends substantially horizontally and including spraying said waste liquid into said flue at a location which is at most 10 m upstream from said vacant dust collection chamber.

* * * * *